May 10, 1960  A. G. SCHMIDT  2,935,910
STEREOSCOPIC HEADBAND LOUPE
Filed May 12, 1955  2 Sheets-Sheet 1
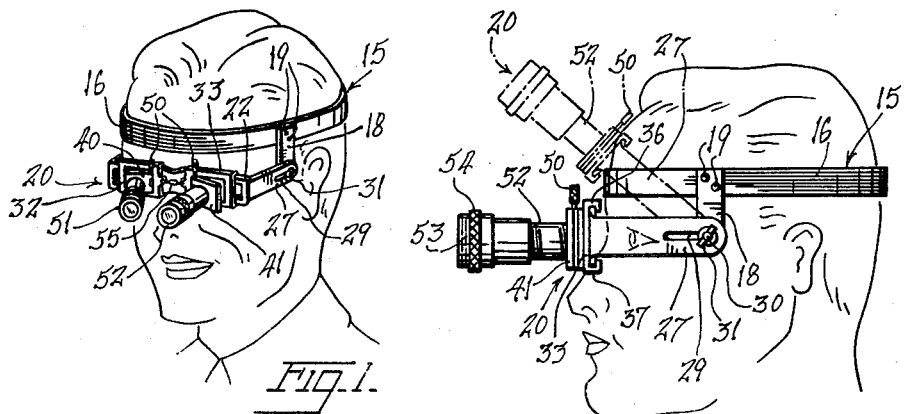
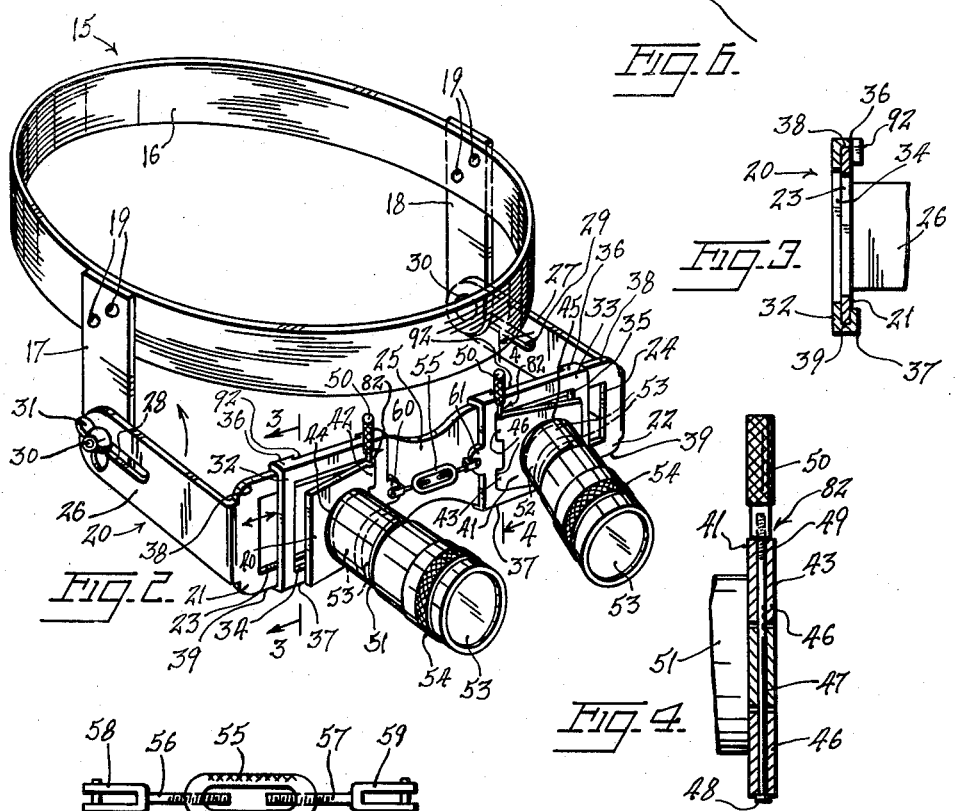
INVENTOR.
ARNO G. SCHMIDT
BY
ATTORNEY

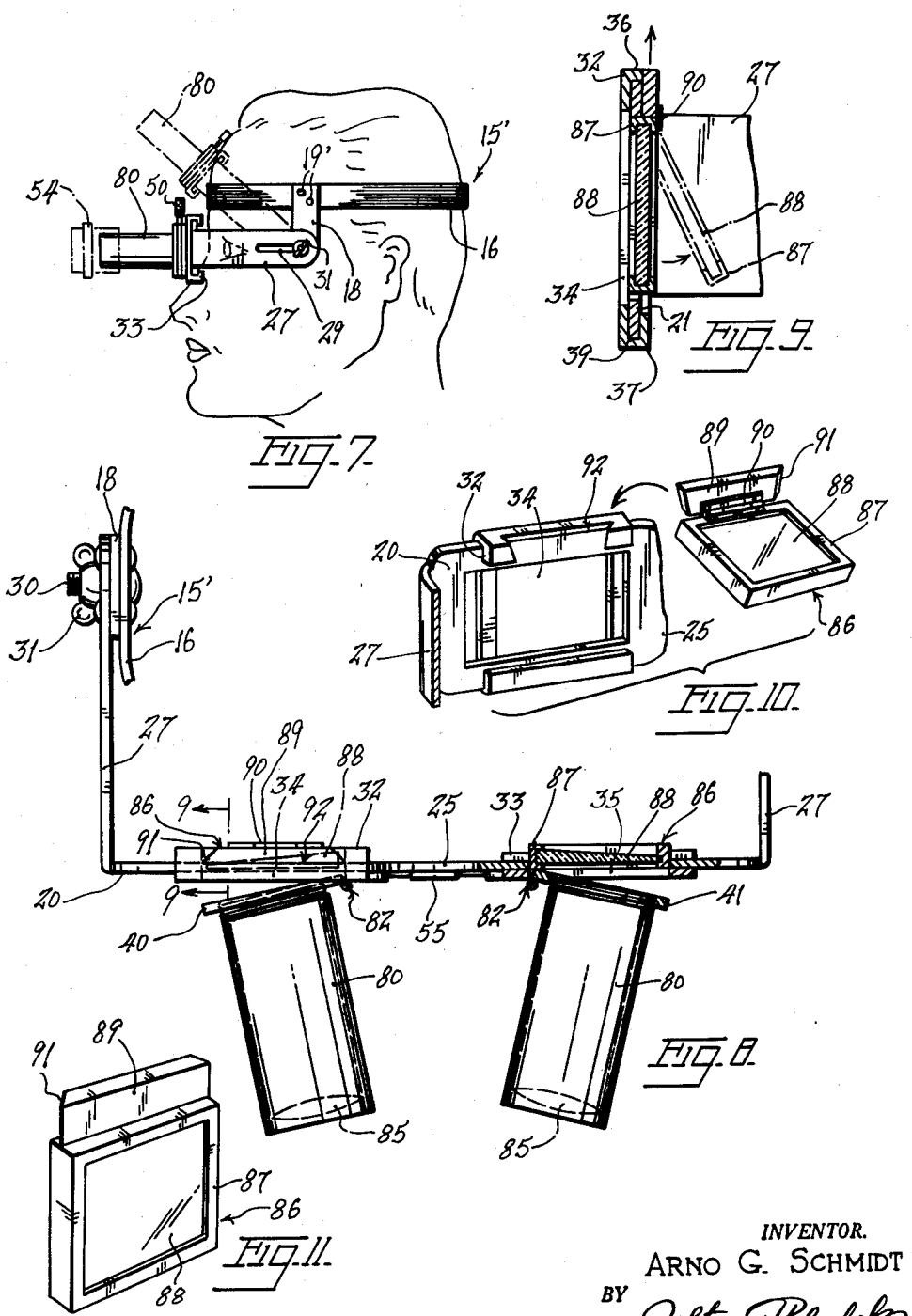

United States Patent Office 2,935,910
Patented May 10, 1960

2,935,910

STEREOSCOPIC HEADBAND LOUPE

Arno G. Schmidt, New York, N.Y.

Application May 12, 1955, Serial No. 507,769

1 Claim. (Cl. 88—39)

This invention relates to new and useful improvements in optical apparatus.

More particularly, the present invention proposes the construction of an improved stereoscopic headband loupe which can be used by doctors in operating and by machinists, engravers, watchmakers, laboratory workers and the like in doing their work, and which will safely and efficiently serve their purposes.

A primary and most important object of the present invention is to provide a stereoscopic headband loupe in which the lenses, lens holders and other parts of the loupe are made removable and interchangeable in order to secure various powers of magnification and furthermore to change from a regular stereoscopic loupe to a stereoscopic telescope loupe.

As a further object, the present invention proposes forming the loupe adjustably secured to a headband for raising and lowering at will and for securing any number of tilted settings or positions.

Still further, the present invention proposes constructing the loupe with adjustable lenses, lens holders and other parts so as to secure interchangeability of parts for comparatively widely different degrees of magnification and for using the loupe either as a regular stereoscopic loupe or as a stereoscopic telescope loupe.

Another object of the invention proposes forming the stereoscopic telescopical loupe with adjustable means to make the working distance between the front lenses of the loupe and the object much longer for the same power of magnification than on regular loupes.

Another object of the invention proposes constructing the loupe so that different adjustments can be made for any person according to his particular need or desire and so that it can be used both by persons wearing spectacles and those without eyeglasses.

A further object of the invention proposes forming the loupe so that the lens holding members can be adjusted laterally by turning a conveniently located turnbuckle and so that it can be tilted on mounting hinges to, and locked in, any desired angle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a person wearing a telescopic form of loupe constructed and arranged in accordance with the present invention.

Fig. 2 is a perspective view of the loupe shown in Fig. 1.

Fig. 3 is a sectional view taken on line 3—3 of Fig. 2.

Fig. 4 is a sectional view taken on line 4—4 of Fig. 2.

Fig. 5 is a top plan view of the turnbuckle member shown in Figs. 1 and 2.

Fig. 6 is a side view of the said loupe with telescopic extensions and with a person's head and the raised position of the loupe indicated in dot-dash outline.

Fig. 7 is a view similar to Fig. 6 showing the use of a regular stereoscopic loupe arranged according to the present invention.

Fig. 8 is a top plan view of the loupe of Fig. 7, parts being shown in section and parts being broken away.

Fig. 9 is an enlarged sectional view taken on the plane of the line 9—9 of Fig. 8.

Fig. 10 is a perspective view of the prism device and its support preparatory to insertion of the prism device into the support.

Fig. 11 is a rear perspective view of the prism device shown in Fig. 10.

The stereoscopic headband loupe of the present invention is designated generally in the drawings by the reference numeral 15.

Loupe 15 has a headband 16 which may be elastic as shown or may be of any other flexible material and secured by buckles, snaps or other well-known fasteners (not shown).

Secured to the headband 16 at spaced intervals are a pair of rigid straps 17 and 18 arranged to be dependent from the headband in front of the ears of a wearer of the headband (see Figs. 1 and 6). The straps 17 and 18 may be secured to the outside headband 16 by rivets 19 or any other fastening means.

A frame 20 is also provided for the loupe 15. Frame 20 has eye portions 21 and 22 with eye openings 23 and 24, respectively, and a nose bridge 25. In addition, frame 20 has side extensions 26 and 27 extending from the eye portions 21 and 22. Alignable bolt openings in the form of slots 28 and 29 are provided in the free ends of each strap and in the free ends of each side extension. Bolts 30 with wing nuts 31 serve as locking members pivotally to connect the straps 17 and 18 to the frame 20, the bolts 30 extending through the aligned bolt openings 28 and 29 which will permit adjustment of the device toward or away from the eyes.

Slidably mounted on frame 20 over the eye portions 21 and 22 are slide members 32 and 33 having eye openings 34 and 35 which are disposed over eye openings 23 and 24 of the frame's eye portions 21 and 22. As shown, the upper and lower edge portions 36 and 37 of the slide members 32 and 33 are bent to extend over the upper and lower edges 38 and 39 of the frame's eye portions 21 and 22.

A pair of tilting plates 40 and 41 have end sides or edge portions 42 and 43 pivotally secured to slide members 32 and 33 adjacent the nose bridge of the frame as shown at 82. Tilting plates 40 and 41 have central openings 44 and 45 and at their edge portions 42 and 43 are hinge portions 46 which are adapted to receive a pintle or hinge pin 47. An abutment 48 is provided at one end of each hinge pin 47 and the other end 49 of each hinge pin is threaded to receive an internally threaded pivot adjusting and locking cap or knob 50. By tightening the knobs 50 the tilting plates 40 and 41 can be held at any tilted angle.

A pair of lens holders 51 and 52 with lenses 53 mounted in them are secured to the tilting plates 40 and 41 over the central openings 44 and 45 of the tilting plates. Focusing and adjusting rings 54 are provided on the lens holders 51 and 52 to focus or adjust the lenses 53 as desired. The lens 53 is of a focal length of from 6 to 8 inches depending upon the working distance between the instrument and the object being viewed.

Slide adjustment means for lateral adjustment of the lens holders is provided by a turnbuckle member 55 having two threaded rods 56 and 57 which are connected by clevises 58 and 59 to opposed end extensions 60 and 61 on slide members 32 and 33. The turnbuckle member 55 is relatively small and is conveniently located in front of and adjacent the nose bridge of frame 20.

The apparatus is readily transformable from a stereoscopic telescopic loupe such as the loupe 15 to a regular stereoscopic loupe 15', as shown in Figs. 7 to 11, inclusive. In this form of the invention, the lens holders 51 and 52 of the tiltable plates 40 and 41 of the stereoscopic telescopic loupe are removed and are replaced by tubes or lens holders 80 of the regular stereoscopic loupe. These tubes are threaded onto tilting plates 40 and 41, which are hingedly secured to the sliding members 32 and 33 adjacent the nose bridge of the frame 20 by hinges 82. Each tube 80 contains a regular stereoscopic unit including a regular stereoscopic loupe lens 85 at the front or outer end of the tube.

With the regular stereoscopic loupe, a prism device 86 shown in detail in Fig. 11 is removably mounted in each of the sliding frame members 32 and 33. Each prism device consists of a substantially square frame 87 supporting a prismatic lens 88. A leaf member 89 is connected to the frame 87 by a hinge 90 and is formed with slanting side end edges 91. The leaf member 89 is adapted to be inserted into the dovetail groove 92 formed in the frame 32 or 33 with its slanting edges 91 slidably engaging the slanting edges of the groove 92 so that the frame 87 is securely but removably supported on the supporting frame member 32 or 33. When the leaf member is thus inserted into and interlocked with its supporting frame, the frame 87 with its lens 88 may be swung against the rear side of the supporting frame 32 or 33 with the lens 88 in register with the eye openings 34 or 35 therein.

The hinged and tiltable mounting of the tubes 80 permits ready adjustment of the apparatus. The first adjustment for this purpose is accomplished by turning the turnbuckle 55. The second adjustment is effected by tilting the tubes 80 on their hinges 82.

The transformation of the lenses, lens holders, prisms and telescopic units is readily effected. First, for a magnification power up to 2½ times regular stereoscopic power, the prismatic lenses 88 are applied without the lenses 85.

Secondly for magnification over 2½ times and up to 10 times and upwards, if a very small field of view is sufficient, the lenses 85 in the front end of the tubes 80 of a certain selected power are provided. The prisms 88 cannot be tilted with the lens tubes 80 because this would produce distortion of the image.

The length of the lens tube is determined by the power of magnification selected. For example, on a 5 times magnification the distance between the lenses and the object being viewed is 2 inches because lenses of 2 inches focal length are necessary. Further, because the pupil distance of the eyes averages nearly 3 inches, it is not advisable to keep the distance between the eyes and the object less than 4 inches. A closer distance than 4 inches would, because of the too great convergence angle of the eyes, greater than the inserted prisms could practically balance, produce eye strain. In addition, the stereoscopic effect in reference to the object would be overproduced and impractical.

Also because a 5 times magnification on a regular stereoscopic loupe can only be produced by lens of 2 inches focal length, respectively, 2 inches lens distance from the object, and because on the other hand the 4 inch minimum eye distance from the object must be kept on account of the angle of convergence, the 5 times magnification lenses of 2 inches focal length must be held from the eyes a distance of 2 inches.

It will be understood that the higher the power, over 2½ times regular stereoscopic loupe magnification, the closer the lenses have to be located toward the object, and the farther from the eyes on a regular stereoscopic loupe on account of the angle of convergence.

A particular advantage of the telescopic loupe is that the working distance between the front lenses of the loupe and the object being viewed for the same power of magnification is much greater than on thet regular stereoscopic loupe.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A stereoscopic loupe, comprising an endless annular headband, a pair of rigid straps dependent from the headband at opposite sides thereof, a generally U-shaped frame supported by said straps near the ends thereof, said frame having eye portions with rectangular eye openings therein, a nose bridge connecting said eye portions, said frame having side extensions extending forwardly from and rotationally and slidably adjustable with respect to said straps, said extensions at their forward ends being connected to the eye portions of said frame, a pair of rectangular slide plates with rectangular eye openings therein slidably secured over the eye portions, a pair of flat rectangular plates each having one side pivotally secured to one of the side plates adjacent the nose bridge, said flat rectangular plates being adjustably positionable respectively on axes parallel to the planes of said side plates by pivot adjusting means, said flat plates having circular central openings, a pair of elongated cylindrical lens holders with lenses mounted therein secured to the flat plates over the central openings therein and extending forwardly therefrom, slide adjusting means for the lens holders located adjacent the nose bridge for moving the lens holders toward and away from each other, said pivot adjusting means being a pair of pivot locking members and a pair of pivot pins, said pivot pins pivotally connecting the flat plates to the slide plates, said lens holders having threaded ends, and a pair of telescopic lens holding members with telescopic lenses and threaded ends adapted removably and adjustably to fit on the lens holders and extending forwardly therefrom.

References Cited in the file of this patent

UNITED STATES PATENTS

| | | |
|---|---|---|
| 749,046 | Folmer et al. | Jan. 5, 1904 |
| 1,905,675 | Baker | Apr. 25, 1933 |
| 2,024,322 | Wittig | Dec. 17, 1935 |
| 2,270,931 | Corcoran | Jan. 27, 1942 |
| 2,425,522 | Ellis | Aug. 12, 1947 |
| 2,625,855 | Gaylor | Jan. 20, 1953 |
| 2,659,266 | Swisher | Nov. 17, 1953 |

FOREIGN PATENTS

| | | |
|---|---|---|
| 595,729 | Great Britain | Dec. 15, 1947 |